United States Patent

Pate

[15] 3,679,063
[45] July 25, 1972

[54] MECHANISM FOR OPERATING THICKENER RAKE ARMS

[72] Inventor: Robert Lee Pate, Pittsburg, Kans.

[73] Assignee: The McNally Pittsburg Manufacturing Corporation, Pittsburg, Kans.

[22] Filed: Aug. 20, 1970

[21] Appl. No.: 65,522

[52] U.S. Cl..............................210/526, 210/530, 210/531, 210/524
[51] Int. Cl.......................................B01d 12/00
[58] Field of Search..................210/530, 531, 528, 520, 524, 210/527, 526

[56] References Cited

UNITED STATES PATENTS

| | | | |
|---|---|---|---|
| 2,078,720 | 4/1937 | Sayers | 210/526 |
| 2,098,463 | 11/1937 | Morehead | 210/530 |
| 2,418,189 | 4/1947 | Hordell | 210/530 |
| 2,295,943 | 9/1942 | Finney | 120/531 |
| 2,650,707 | 9/1953 | Scott | 210/531 |

Primary Examiner—Frank W. Miga
Attorney—Pennie, Edmonds, Morton, Taylor and Adams

[57] ABSTRACT

A thickener according to the invention is provided with a mechanism for operating the rake arms of the thickener without the use of central drive columns and central drive mechanism but comprising a traction means including a plurality of spaced cable carriers distributed and mounted for movement along the peripheral wall of the thickener tank, cable means respectively connecting the outer ends of the rake arms to one of the cable carriers, an endless cable drive means including a cable length extending around and engaging all of the cable carriers, means for continuously pulling with cable drive means and thereby advancing the cable carriers and the rake arms, and cable means for elevating the inner ends of the rake arms to avoid overloading in the case of an excessive amount of sediment in the thickener.

9 Claims, 8 Drawing Figures

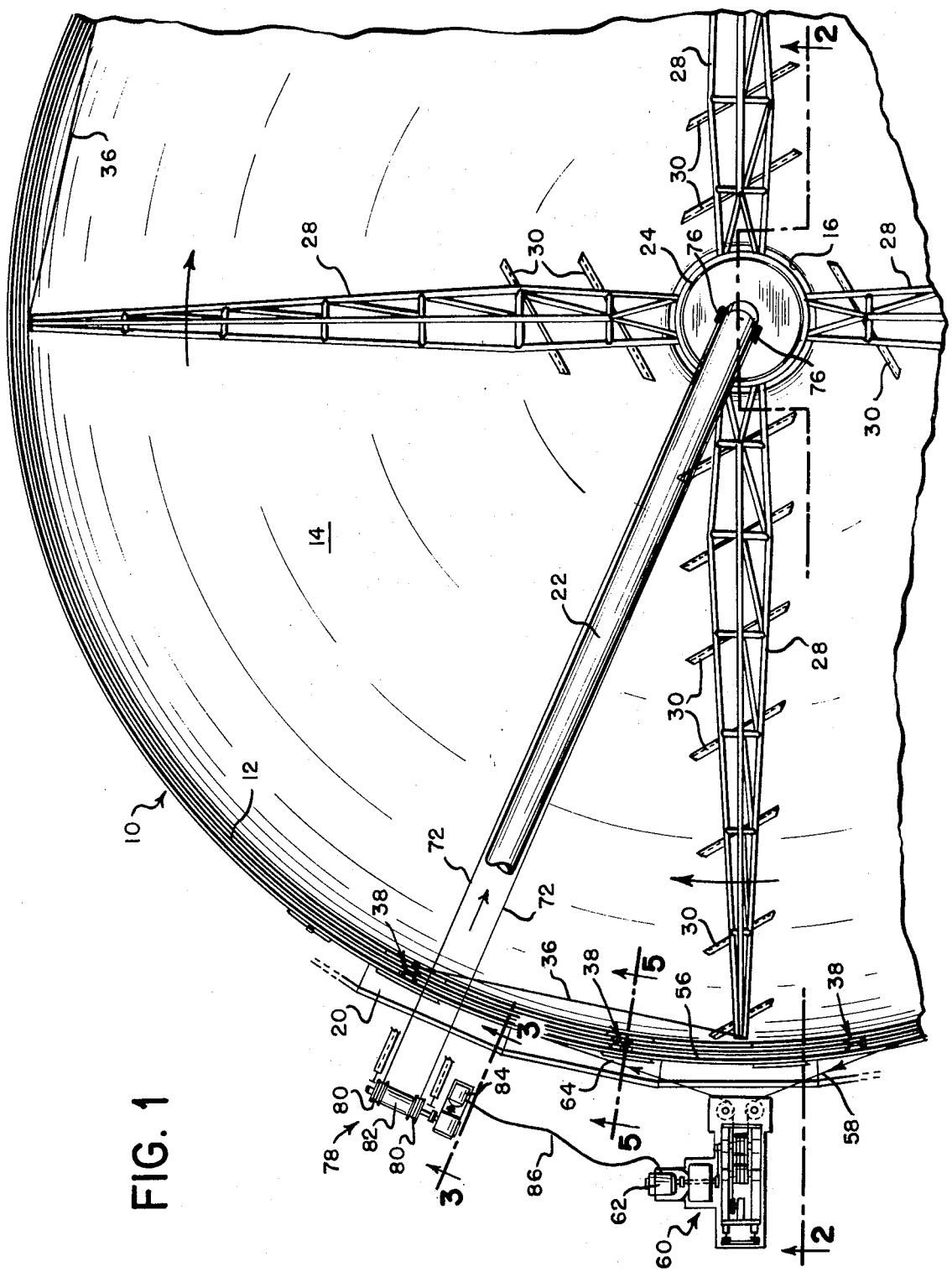

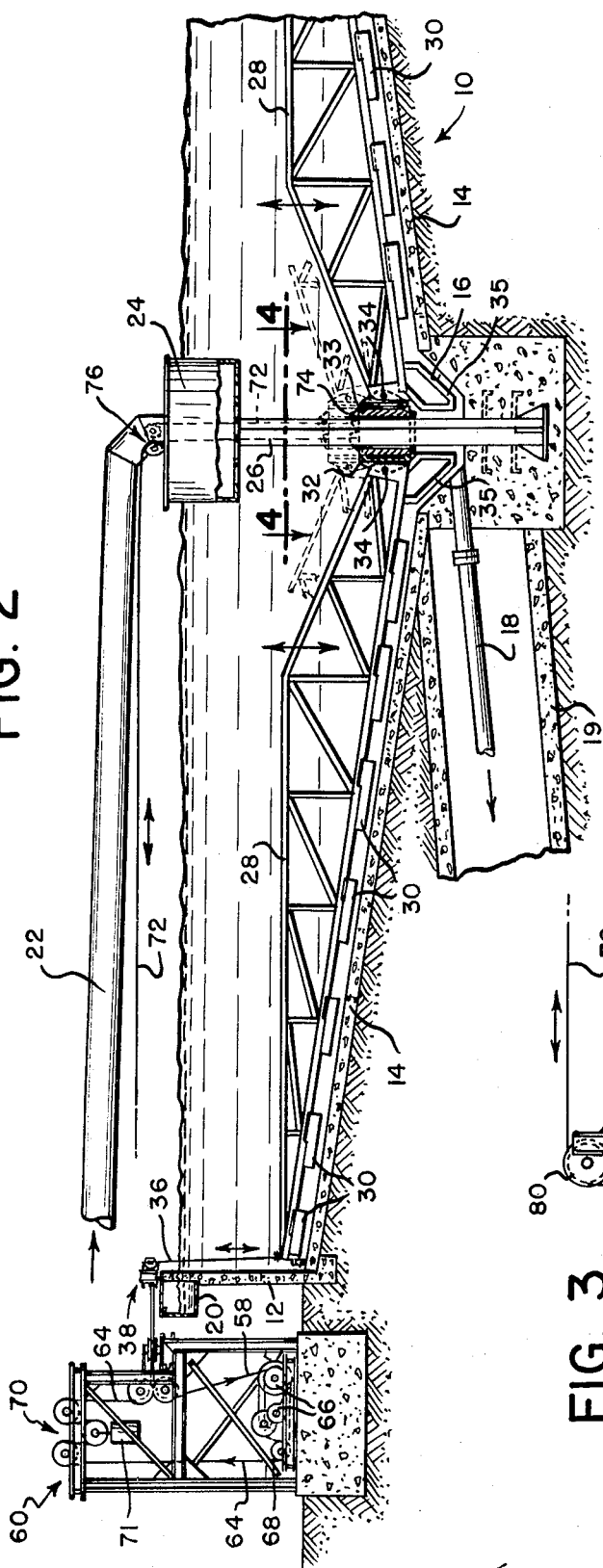

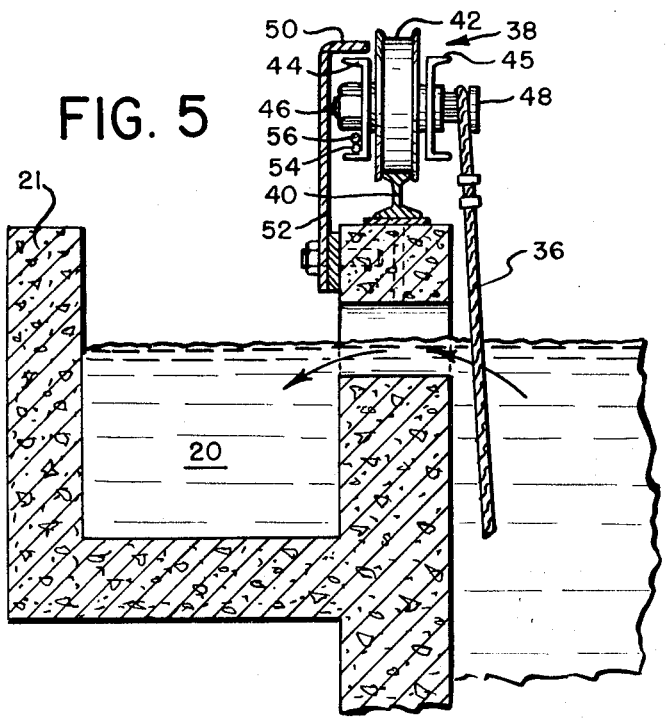
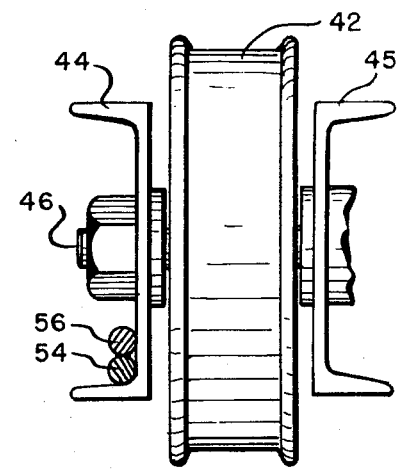
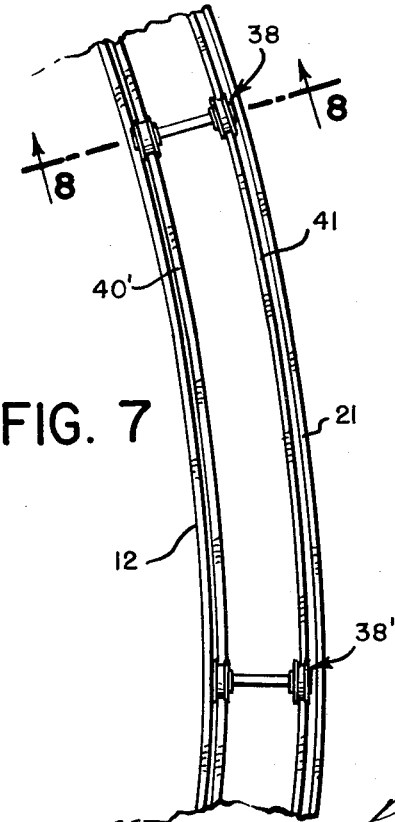
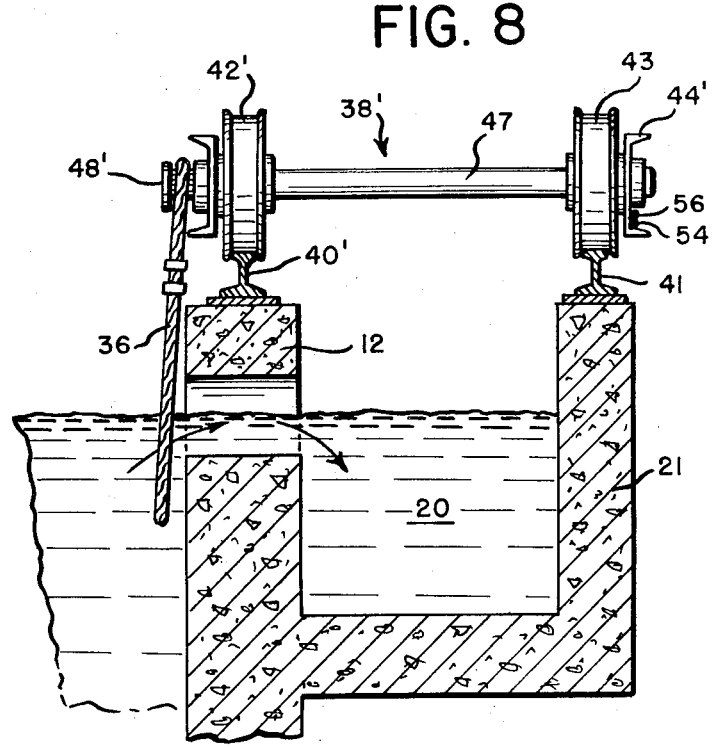
INVENTOR
Robert Lee Pate

MECHANISM FOR OPERATING THICKENER RAKE ARMS

BACKGROUND OF THE INVENTION

1. Field of the Invention

The present invention relates to improvements in thickeners and particularly with respect to a mechanism for operating the thickener rake arms.

2. Description of the Prior Art

At the present time thickeners are built in sizes up to from 300 to 600 feet in diameter and are usually provided with a central gearing drive head for rotating truss-type rake arms extending radially from the central pier of the thickener. Various types of drive heads are provided with expensive gear arrangements. It is an object of the present invention to avoid such structures and to provide a peripheral traction drive system. U.S. Pat. No. 2,382,409 provides a carriage at the outer end of a rake truss and driven by a motor along the wall of the thickener for rotating the rake truss around in the thickener.

Proposals have been made for pulling the rake arms of a thickener by means of a plurality of cables connected at spaced points along each rake arm and extending upwardly to a heavy steel drive truss projecting radially from a central drive tower. This drive system, however, does not avoid the use of expensive central drive towers, central gear heads and central caissons. Furthermore, there is no leverage advantage over the direct central drive of the rake arms of a thickener.

U.S. Pat. No. 2,768,749 discloses the use of cables for advancing rakes or scrapers. In one form four rake arms in a cylindrical sedimentation tank are rotated by a central drive including a large axially-arranged pulley rotated by a cable driven periodically in opposite directions, thus oscillating the rake arms in the sedimentation tank. The mechanism for oscillating the arms includes electrical controls for reversing the direction of pull of the cable around the pulley.

One of the important objects of the present invention is to avoid the use of central drive towers and mechanisms and the use of an expensive bridge structure extending from the periphery of the thickener to the central drive column or caisson. The thickener of the present invention employs a small central shaft to which the inner ends of the rake arms are swiveled, but this does not interfere with the supply of liquid containing suspended material right into the central portion of the thickener.

Another object of the invention is to provide a construction which does not require the use of a heavy crane to move drive equipment into the center of the thickener. On the other hand, the drive mechanism of the present invention may be placed at any desired location on the outside of the thickener itself.

SUMMARY OF THE INVENTION

The thickener construction according to the present invention is of the type which may be referred to as a traction-drive-type adapted to take advantage of maximum leverage by pulling the rake arms of the thickener around in the thickener by means of a pull cable attached to the outer end of each rake arm. The traction mechanism includes a plurality of spaced cable carriers distributed around and mounted for movement along the peripheral wall of the thickener tank. A pull cable from the outer end of each rake arm is connected to one of these cable carriers. The traction mechanism also comprises an endless cable drive means extending around and engaging all of the cable carriers and means for continuously pulling the endless cable and thereby advancing the cable carriers and the rake arms.

A portion of the endless cable is continuously drawn through a motor and drum drive means. As the cable leaves the motor and drum drive means, it runs back to the cable carriers around the tank so as to maintain continuous contact and movement.

The invention also includes cable means for automatically lifting the rake arms when they become overloaded when too many solids are being delivered to the thickener. According to the present invention, lift cables are run from a drum outside the thickener to pulleys on a central post. The arms are to be raised in response to an overload alarm either mechanically or automatically. For example, when the amperage of the main drive motor running the endless cable drive increases a predetermined value because of an overload on the rake arms, means is provided for electrically actuating the lifting motor, which is later stopped by limit switches.

The foregoing features of the invention are described more in detail hereinafter.

BRIEF DESCRIPTION OF THE DRAWINGS

An embodiment of the invention is illustrated in the accompanying drawings in which:

FIG. 1 is a diagrammatic, broken plan view of a four-rake-arm thickener comprising a cylindrical tank, constructed in accordance with the invention, FIG. 2 is a broken vertical sectional view taken on the line 2—2 of FIG. 1, FIG. 3 is a broken elevational view taken on the line 3—3 of FIG. 1, FIG. 4 is a diagrammatic view showing the arrangement of the rake arm lugs at the center of the thickener and the pulleys and cables at the top of the center column for lifting the rake arms, FIG. 5 is a broken vertical sectional view taken on the line 5—5 of FIG. 1, FIG. 6 is an enlarged view of the cable carrier unit shown in FIG. 5, FIG. 7 is a broken plan view of a double track arrangement for cable carriers of the form shown in FIG. 8, and FIG. 8 is a vertical sectional view taken on the line 8—8 of FIG. 7 showing the details of a carrier unit operating on a pair of spaced rails around the periphery of the thickener tank.

DESCRIPTION OF THE PREFERRED EMBODIMENT

A thickener according to the invention and as illustrated in FIG. 1 and 2 comprises a concrete tank 10, having a peripheral wall 12 and a bottom 14 sloping into a discharge cone 16 from which the underflow is discharged through an outlet pipe 18 running through a concrete tunnel 19. The upper portion of the tank outside the wall 12 is provided with an overflow lauder 20. The mixture of liquid and suspended material is supplied to the tank through a feed-pipe 22 which delivers into a feed-well 24 supported on a central square column 26. The bottom of the feed-well is perforated so that the feed-material is discharged directly into the center of the thickener around the column.

The sediment deposited in the tank on the floor 14 is moved toward the center by four similar truss-type rake arms 28 carrying scrapers or rakes 30 of conventional form. The rake arms are each pivoted to a side of a square mounting member 32 supported by and rotatable on a sleeve 33 having a cylindrical outer surface and set on the lower portion of the column 26. Each rake arm truss is pivoted to spaced lugs on the member 32 by pivot pins 34, as shown in FIG. 4. The lower inner portions of the rake arms 28 are provided with a cone scrapers 35 for moving the sediment toward the underflow discharge 18. The pivoted hinge connections of the rake arm trusses with the member 32 are such that the arms may be raised in the case of an overload of sediment on the floor 14. Since the rake arms are mounted and rotated individually, from their outer ends, it is unnecessary to provide accurate hinge or pivot arrangements connecting the truss arms with the member 32.

The means for rotating the rake arms 28 around in the thickener tank comprises a length of cable 36 for each arm, connected by one end to the outer end of the rake arm and by the other end to one of a number of spaced cable carriers 38 riding on an endless rail 40 mounted on the concrete wall 12, as shown in enlarged detail in FIG. 5. The cable carriers 38 are distributed around the periphery of the thickener so that there will be a cable carrier for each of the rake arms as well as some intermediate carriers for reasons pointed out below. Each cable carrier 38 as shown in FIGS. 5 and 6 includes a double-flanged running wheel 42 mounted in a frame comprised of brackets 44 and 45 fixed to a shaft 46 by a nut at the outside. At the inside the shaft is enlarged and in the form of a spool 48 for receiving and holding the end loop of the pull cable 36. The arrangement of the cable carrier 38 is such that the shaft 46 and brackets 44 and 45 do not rotate.

The endless drive cable is carried on the cable carriers 38 and, in the example illustrated in FIGS. 1, 2, 5 and 6, comprises two runs or loops 54 and 56 engaging the brackets of most of the carriers around the tank. A moving length 58 of the lower loop is continuously drawn at a tangent to a cable drive unit 60 operated by an electric motor 62. As the drive unit continuously pulls the length 58, it continuously delivers another moving length 64 of the same loop to the advancing cable carriers 38 as the upper run. The cable carriers 38 moving past the cable drive unit 60 carry only one moving run, unless an additional loop or loops are utilized.

The cable drive unit 60, shown more in detail in FIG. 2, may be of known type. It receives the moving cable length 58 over direction-changing pulleys onto a pair of similar driving drums 66 which are driven by the electric motor 62. The drums 66 have multiple circular grooves receiving multiple wraps of the cable, with each wrap extending around both drums. The drums are staggered one half the distance between grooves; and therefore, the cable moves sideways for one half the cable spacing.

As illustrated diagrammatically in FIG. 2, the cable length 58 runs downwardly around the drums 66 and moves across them for several wraps. The cable runs out from the bottom of the drums around a pulley 68, then up over a counterweight unit 70 provided with a counterweight 71 in the slack side of the moving cable. This unit not only takes up any slack and stretch in the cable, but is used to give the proper amount of tension on the drums 66 to develop the driving power without cable slippage. The drums 66, therefore, deliver the moving cable length 64, which runs over direction-changing pulleys, and at about a tangent to the tank, back to the cable carriers 38 moving around the tank. The cable loops or runs 54 and 56 are shown in FIGS. 5, 6 and 8, as carried in the lower part of the bracket 44 and 44'.

Any tendency of the rake pull cables 36 to tilt the cable carriers 38 inwardly is overcome by providing a circular band 50 extending around the tank and located directly above the upper part of the brackets 44. This particularly applies to the form of cable carrier illustrated in FIG. 5. The band 50 is supported in place by upright members 52 at spaced locations around the tank.

A modified form of cable carrier structure and arrangement is illustrated in FIGS. 7 and 8, in which elements corresponding to those of FIG. 5 are identified by primed reference characters. The cable carrier 38' itself as shown in FIG. 8 comprises free-running flanged wheels or rollers 42' and 43 carried respectively on steel rails 40' and 41, the latter of which is mounted on the wall 21 of the lauder 20. The rollers or wheels 42' and 43 are carried on a dead shaft 47 which provides the spool 48' for holding the loop of the cable 36. The opposite end of the shaft 47 carries a bracket 44', the lower portion of which carries the cable runs or loops 54 and 56. Since the carrier unit 38' as shown in FIG. 8 is heavy and includes considerable space between the flanged rollers or wheels 42' and 43, there is no tilting tendency due to the tightness and pull by the drive cable or wire rope.

The raising of the inner end portions of the truss arms 28 in case of an overload of sediment on the floor 14 is effected by means of a pair of cables 72, each of which has an end connected to a lug 74 on the top of the sleeve 33 as shown in FIGS. 2 and 4. These cables extend vertically upward along the column 26, through the feed-well 24, over a pair of pulleys 76 and the laterally to an operating and control unit 78 shown diagrammatically in FIG. 1. The ends of the cables extending over pulleys 80 to the unit 78 are wrapped round and attached to a rotatable drum 82 actuated in either direction by a motor 84. The motor 84 is actuated in response to the load on the driving motor 62 as transmitted by a connecting control line or lines 86. The line 86 will connect into power supply switch boxes for the motors 62 and 84 in a known manner, so that the motor 84 is actuated in one direction when the power load on the motor 62 is normal, to lower the inner end portions of the rake arms 28. In the event of an overload on the motor 62, the motor 84 will be operated in the opposite direction to wind up the cables 72 on the drum 82 and raise the inner end portions of the rake arms 28. Usually it is only necessary to raise the rake arms 2 or 3 feet.

The structure provided in FIG. 3 for the operating and control unit 78 is suitably braced to accommodate the stresses on the cables 72. FIG. 3 also shows certain controls for limiting the action of the motor 84. For example, limit switches 88 and 90 are provided along the frame, adjacent to one of the cables 72, actuated by a lug 92, carried by that cable. As the cables 72 move upwardly from the drum 82 to lower the rake arms, the lug actuates the limit switch 88 to stop the motor 84. The limit switches 88 and 90 are connected along with the control line 86 into a control box 94 for the motor 84. When an overload is again encountered and the motor 84 is operated to wind cables 72 on the drum 82, the motor is again stopped when the lug 92 engages the limit switch 90. Each limit switch returns to normal, ready for another operation following the actuation of the other limit switch.

The raising and lowering of the rake arms occurs during their rotation since their inner end portions are carried by the member 32 which is freely rotatable on the inner sleeve 33. When the inner end portions of the arms are lifted, the outer ends are carried on rollers as shown diagrammatically in FIG. 2. The rollers normally continuously engage the floor 14, and the pull cables 36 are set at such an incline that they have no tendency to lift the outer ends of the rake arms.

During the operation of the thickener described above, the liquid containing suspended materials is delivered to the center of the thickener through the pipe 22. The clarified liquid overflow is delivered into the lauder 20 for disposal or return to the plant. The sediment or sludge is collected in the cone 16 and discharged through the sludge pipe 18. The rake arms 28 are rotated around in the thickener tank at a very slow rate, for example, only a few hundredths of a revolution per minute. This indicates how slowly the drive cable is drawn from and returned to the cable carriers 38 by the drive unit 60. The slow movement may account for the deposition of excess sediment although the suspended material in the liquid supplied to the thickener may vary considerably in sediment content. In any case, the sediment rakes 28 are not damaged by overload because of the safety provided by the automatic lifting arrangement.

The thickener construction of the present invention has a number of important advantages in that it does not include a costly center drive pedestal which must exert a great torque to the rake arms. The drive arrangement provided by the endless cable drive takes advantage of an important leverage arrangement since the pull on the rakes is entirely from their outer ends. Many thickeners with central drive towers and caissons require several thousand inch pounds of torque to effect rotation of the rake arms. Furthermore, the steel employed in such structures is costly and their errection is very expensive.

A further advantage is the saving in costs because of the peripheral drive and the endless cable to effect movement of the rake arms from their outer ends. This eliminates the necessity of a truss-type bridge structure extending from the periphery of the thickener to a central drive mechanism. In the present construction the only item of importance that goes to the center of the thickener is the feed pipe. The drive and other controls may be located anywhere on the outside of the thickener itself. Furthermore, the feed-pipe can deliver the feed directly into the center portion of the thickener since there are no machinery or caisson structures occupying that area.

The drive cable and cable carrier arrangement effects the simultaneous advance of all rake arms and to the same extent without costly truss structures and power driving heads. In addition to the cable carriers used to pull rake arms, a sufficient number of intermediate cable carriers are employed to provide a nearly circular drive cable arrangement around the tank. Furthermore, the cable loops provided on the cable carriers are sufficient in number and maintained under sufficient tension by counterweighting to avoid any slippage on the carrier brackets, which themselves may have anti-slip cable-engaging surfaces or means of known type.

I claim:

1. In a thickener of the type including in combination a cylindrical tank having a bottom sloping toward the center and a peripheral wall, a receiver for liquid overflow at the wall and a central sludge discharge outlet, means for supplying liquid containing suspended material to the central portion of the tank, a rake arm carrying a plurality of sediment rakes mounted for rotation in the tank and extending radially from the central portion of the tank to its periphery, and traction means connected to the outer end of the rake arm for pulling it around in and for effecting its rotation in the tank, the improvement wherein the traction means comprises
   a. a drive cable extending around the periphery of the tank and rotatably movable in a path around the periphery of the tank,
   b. a plurality of spaced cable carriers distributed around the tank supporting said drive cable and mounted for movement in spaced relation in a direction around the periphery of the tank and for movement by the drive cable along said path,
   c. means on each cable carrier for receiving, supporting and holding the drive cable,
   d. pull means connecting the outer end of the rake arm to one of said cable carries,
   e. said drive cable extending around the cable carriers and engaging the supporting means of all of said cable carriers, and
   f. means for continuously pulling the drive cable in a direction around the tank along said path to advance the cable carriers around the tank, effect rotation of the rake arm in the tank and movement of settled material toward the sludge discharge outlet.

2. A thickener as claimed in claim 1, including an endless track on which said cable carriers are mounted, each cable carrier including a frame mounted on a free-running wheel operable along the track, the receiving and holding means for the drive cable and means for holding the pull means for the rake arm being located on said frame of said one carrier.

3. A thickener as claimed in claim 2, wherein the drive cable and the receiving means therefor are located on the outside and the means for holding the rake arm pull means is located on the inside of the cable carrier frame.

4. A thickener as claimed in claim 2, wherein the means on the frame for receiving and holding the drive cable comprises a bracket on the outside lower portion of the frame adapted to receive a plurality of runs of the drive cable.

5. A thickener as claimed in claim 2, wherein the endless track comprises a pair of spaced trackways and the cable carrier comprises a pair of spaced wheels or rollers respectively operable on the trackways and mounted for free rotation on a common axle comprising a part of the carrier frame.

6. A thickener as claimed in claim 5, wherein the axle is a dead shaft and the wheels or rollers are loose, and wherein the means for holding the rake arm pull means is on the inner end of the axle and the means for receiving and holding the drive cable is a bracket on the outer end of the axle.

7. A thickener as claimed in claim 1, wherein the drive cable is an endless cable and the pulling means for the drive cable is located outside and in spaced relation to the periphery of the tank, means for diverting a portion of the drive cable from a cable carrier advancing toward the position of the drive cable pulling means, and means for directing a portion of the moving cable from the drive cable pulling means to a cable carrier moving away from the position of the drive cable pulling means.

8. A thickener as claimed in claim 7, wherein the drive cable includes a complete wrap around all the cable carriers in addition to the portions of the endless drive cable moving to and from the drive cable pulling means.

9. In a thickener of the type including in combination a cylindrical tank having a bottom sloping toward the center and a peripheral wall, a receiver for liquid overflow at the wall and a central sludge discharge outlet, means for supplying liquid containing suspended material to the central portion of the tank, a rake arm carrying a plurality of sediment rakes mounted for rotation in the tank and extending radially from the central portion of the tank to its periphery, and traction means connected to the outer end of the rake arm for pulling it around in and for effecting its rotation in the tank, the improvement wherein the traction means comprises
   a. a drive cable extending around the periphery of the tank and rotatably movable in a path around the periphery of the tank,
   b. a plurality of spaced cable carriers distributed around the tank supporting said drive cable and mounted for movement in spaced relation in a direction around the periphery of the tank and for movement by the drive cable along said path,
   c. means on each cable carrier for receiving, supporting and holding the drive cable,
   d. pull means connecting the outer end of the rake arm to one of said cable carriers,
   e. said drive cable extending around the cable carriers and engaging the supporting means of all of said cable carriers,
   f. an electric drive motor outside the tank for continuously pulling the drive cable in a direction around the tank along said path to advance the cable carriers around the tank, effect rotation of the rake arm in the tank and movement of settled material toward the sludge discharge outlet,
   g. an upright column in the center of the tank, a first sleeve supported on the column near the bottom of the tank for slidable up and down movement, said sleeve having an outside cylindrical bearing surface, a second sleeve bearing around, supported by and rotatable on the bearing surface of the first sleeve, means on the outside of said second sleeve for connecting the inner end of the rake arm thereto for up and down pivoting action, a cable operated by a second electric motor connected to the first sleeve for lifting both sleeves and the inner end portion of the rake arm, and
   h. means responsive to an overload on the drive motor for actuating the second motor to lift the inner end portion of the rake arm above the bottom sediment thereby avoiding an excessive overload of sediment on the rake arm.

* * * * *